United States Patent [19]

Gold et al.

[11] Patent Number: 4,699,166

[45] Date of Patent: * Oct. 13, 1987

[54] HYDRAULIC FUSE VALVE ASSEMBLY

[76] Inventors: Harold Gold, 3645 Tolland Rd., Shaker Heights, Ohio 44122; Tadeusz Budzich, 80 Murwood Dr., Moreland Hills, Ohio 44022

[ * ] Notice: The portion of the term of this patent subsequent to Aug. 14, 2001 has been disclaimed.

[21] Appl. No.: 773,836

[22] Filed: Sep. 6, 1985

Related U.S. Application Data

[63] Continuation of Ser. No. 524,382, Aug. 18, 1983, abandoned, which is a continuation-in-part of Ser. No. 414,829, Sep. 3, 1982, Pat. No. 4,465,093, which is a continuation-in-part of Ser. No. 285,596, Jul. 21, 1981, Pat. No. 4,436,111.

[51] Int. Cl.$^4$ ............................................. F16K 17/30
[52] U.S. Cl. ...................................... 137/2; 137/498; 137/517
[58] Field of Search ............... 137/460, 462, 498, 504, 137/517, 468; 137/2

[56] References Cited

U.S. PATENT DOCUMENTS

| | | |
|---|---|---|
| 484,526 | 10/1892 | Valentine . |
| 547,506 | 10/1895 | Sleigh et al. . |
| 1,258,114 | 3/1918 | Haywood . |
| 2,917,077 | 11/1953 | Ziege ............................ 137/517 X |
| 2,925,826 | 2/1960 | Streeter . |
| 2,929,403 | 3/1960 | Steeter . |
| 2,967,543 | 1/1961 | viergutz ........................ 137/504 X |
| 3,085,589 | 6/1960 | Sands ............................ 137/498 |
| 3,661,175 | 5/1972 | Tillman ......................... 137/517 |
| 3,677,605 | 7/1972 | Matsumoto et al. ........... 137/517 X |
| 3,735,777 | 5/1973 | Katzer et al. . |
| 3,794,077 | 2/1974 | Fanshier ....................... 137/517 X |
| 4,383,549 | 5/1983 | Maldavs ....................... 137/498 X |
| 4,465,093 | 8/1984 | Gold et al. .................... 137/498 |

FOREIGN PATENT DOCUMENTS

| | | | |
|---|---|---|---|
| 470376 | 5/1975 | Australia . | |
| 532182 | 10/1956 | Canada ........................ | 137/498 |
| 2324710 | 5/1973 | Fed. Rep. of Germany ...... | 137/460 |
| 2124901 | 9/1972 | France . | |
| 581287 | 10/1976 | Switzerland . | |
| 706674 | 3/1954 | United Kingdom . | |

Primary Examiner—Robert G. Nilson
Attorney, Agent, or Firm—Tarolli, Sundheim & Covell

[57] ABSTRACT

A fluid fuse is quickly operable to shut off fluid flow upon rupture or other failure of fluid conducting line or other structural member downstream of the fuse. The fuse is actuated during decompression fluid flow resulting from decompression of fluid and elastic contraction of structural components downstream of the fluid fuse. During decompression fluid flow, a valve member is moved from an open position to a closed position by two forces generated by a pressure differential caused by sudden decompression of the fluid and developed across two variable, sharp edge, viscosity insensitive orifices, positioned in series and separated by a flow cut-off and sealing surface. The closing force, generated by the pressure differential of the upstream orifice is dominant and increases with the displacement of the closing member in a predetermined manner, permitting the use of a high preload and high rate opposing spring, at relatively low pressure differentials. The sealing surface of the fuse is provided with limited freedom of alignment to permit tight sealing. The fuse assembly includes a manually adjustable bypass arrangement and a pressure peak attenuating control.

12 Claims, 13 Drawing Figures

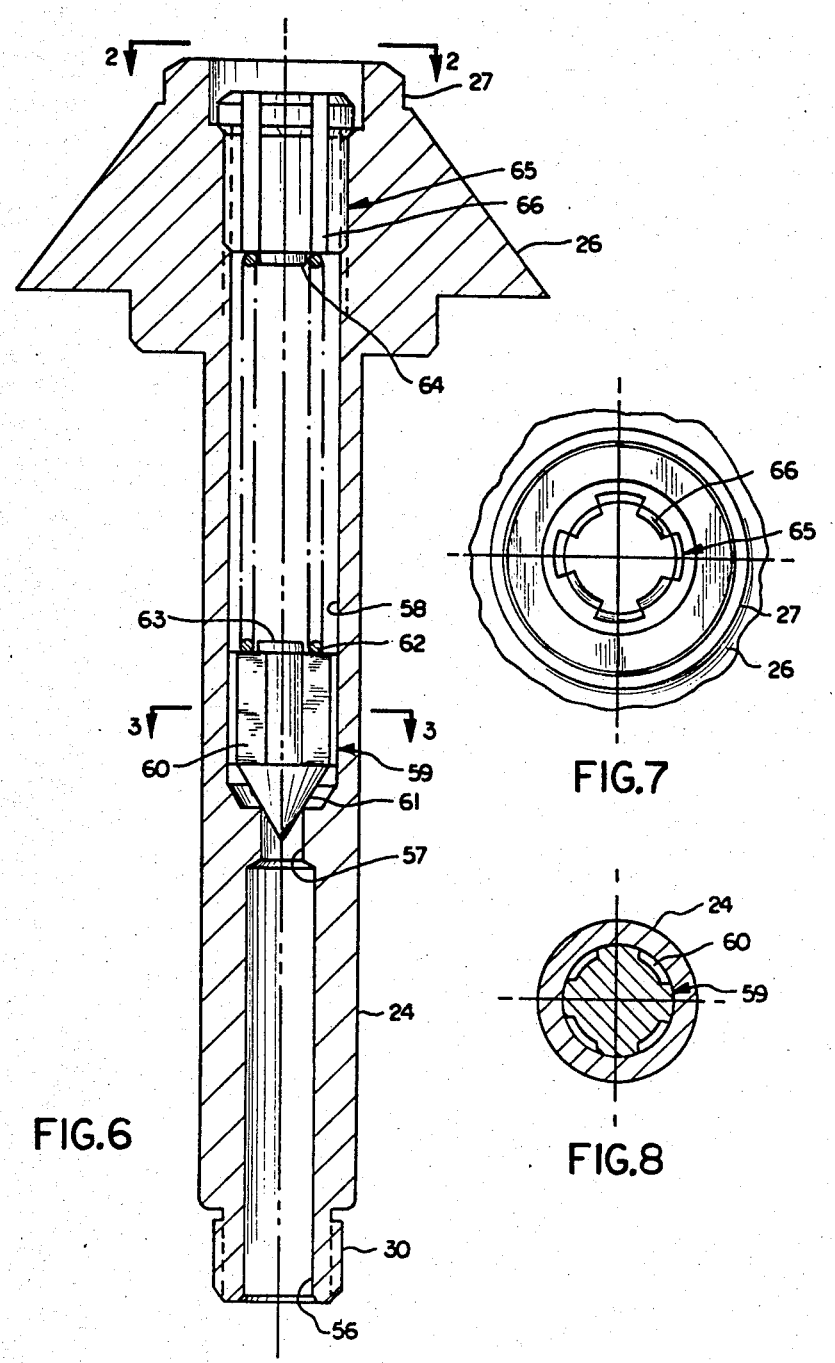

HYDRAULIC FUSE VALVE ASSEMBLY

This application is a continuation of application Ser. No. 524,382 filed on Aug. 18, 1983 now abandoned which, in turn, is a continuation-in-part of application Ser. No. 414,829 filed Sept. 3, 1982, which, in turn, is a continuation-in-part of application Ser. No. 285,596 filed July 21, 1981. The aforementioned application Ser. No. 414,829 has now issued as U.S. Pat. No. 4,465,093. The aforementioned application Ser. No. 285,596 has now issued as U.S. Pat. No. 4,436,111. The benefit is claimed under title 35 U.S. Code, §120, of the filing dates of these applications.

BACKGROUND OF THE INVENTION

This invention relates to hydraulic fuses of the type that pass a system's maximum flow with acceptable pressure loss and which closes in response to a fluid flow which exceeds a predetermined maximum flow.

The fluid fuse of the present invention closes in response to either a gradual increase in fluid flow to a trigger flow rate or a sudden increase in fluid flow upon failure of a fluid conduit or other component of a system with which the fluid fuse is associated. To obtain the desired performance, the lowering of the trigger flow due to the variation of liquid viscosity, or due to external effects such as shock and vibration must not reduce the trigger flow to or below the system maximum flow. The allowable lowering of the trigger flow is dependent on the difference between the mean value of the trigger flow and the system maximum flow. By way of example, if the mean value of the trigger flow is 20 percent above the system maximum flow, the deviation of trigger flow from the mean must be less than 20 percent of the system maximum flow. It is therefore of advantage to utilize a high difference between the mean trigger flow and the system maximum flow and to minimize the effects of viscosity, shock and vibration.

In the related prior art, Jackson U.S. Pat. No. 3,741,241 employs a shut-off device that is biased open by a spring and is driven closed by the pressure drop across the closure device, and Tilman U.S. Pat. No. 3,476,141 and Waterman U.S. Pat. No. 2,821,209 employ a fixed orifice in series with the shut-off device. In both Tilman and Waterman the pressure drop across the fixed orifice produces principally the same force as does the pressure drop across the shut-off device and accordingly, these fuses would be viscosity sensitive even if the fixed orifice were made viscosity insensitive. The viscosity variation encountered in normal liquid service could cause the shut-off flow of these fuses to vary by a factor of greater than 100.

SUMMARY OF THE INVENTION

It is an object of this invention to provide a new and improved valve assembly for use in a system having structural components which hold fluid under pressure and which are elastically expanded by fluid pressure and wherein the valve assembly is operable during decompression fluid flow resulting from decompression of fluid and/or elastic contraction of structural components of the system upstream of the valve assembly to block fluid flow upon a rapid decrease in fluid pressure in the system due to failure of a structural component of the system downstream of the valve assembly.

Another object of this invention is to provide a new and improved valve assembly or fuse valve with a trigger or snap acting flow setting well above the maximum output flow of the system in which it is used and which is capable of being actuated by either a sudden decompression flow of fluid or a gradual increase in fluid flow to a predetermined trigger flow rate.

Another object of this invention is to provide a fuse valve which is viscosity insensitive, with minimum variations in trigger flow level over a wide viscosity range.

It is another object of this invention to provide a fuse valve which is highly insensitive to external shock along the axis of closure and in the direction of fluid flow.

It is another object of this invention to provide a fuse valve which can accommodate a biasing spring of high preload and rate, while the pressure differential across the variable orifice is relatively low at the triggering flow level.

It is another object of this invention to provide a fuse valve generating high closure actuating force at low pressure differential, the rate of change of this force, in respect to the stroke of the closure, being dictated by the rate of convergence of the converging surfaces and resulting in controlled acceleration of the closure.

It is another object of this invention to provide a fuse valve in which the closure is subjected to high decelerating force just before the point of closing.

It is another object of this invention to provide a fuse valve in which the closure is guided by a single, low length to diameter ratio bearing while being accelerated.

It is another object of this invention to provice a fuse valve in which the closure is provided with a limited freedom alignment at seating.

It is another object of this invention to provide a fuse valve with an externally adjustable bypass.

It is another object of this invention to provide a fuse valve assembly with internal pressure peak limiting control.

Another object of this invention is to provide a fuse valve having a pair of portions which generate forces urging the valve toward the closed position when the fuse valve is in the open position.

Briefly, the foregoing and other objectives and advantages of this invention are accomplished by providing a novel fuse valve for use in hydraulic systems and which is triggered to full closure by the short interval of liquid decompression flow and, where the trigger flow value is substantially above the system maximum flow. The fuse valve is provided with two sharp edge discs, separated by a conical sealing surface, which forms two annular, viscosity-insensitive orifices in series, in respect to converging surfaces of revolution of the fuse valve bore. The high controlled acceleration of the conical sealing surface past its trigger point, obtained through the converging surfaces, results in extremely short closing time, with minimum volume of liquid passed downstream of the fuse valve during the closing period. A controlled and high rate of deceleration of the conical sealing surface is provided just prior to seating of the surface. A conical sealing surface aligning guide is included which allows liquid pressure to seat the conical surface on a circular edge with full circular contact. The fuse valve is also provided with an adjustable bypass and with internal pressure peak limiting control.

DESCRIPTION OF THE DRAWINGS

Additional objects of this invention will become apparent when referring to the preferred embodiments of the invention as shown in the accompanying drawings and described in the following description.

FIG. 6 is an enlarged longitudinal section through the shaft identified in FIG. 1 having an over-pressure relief valve therein;

FIG. 7 is a fragmentary view taken at plane 2—2 of FIG. 6;

FIG. 8 is a sectional view taken in the plane 3—3 of FIG. 6;

DETAILED DESCRIPTION OF THE INVENTION

Figure 1:
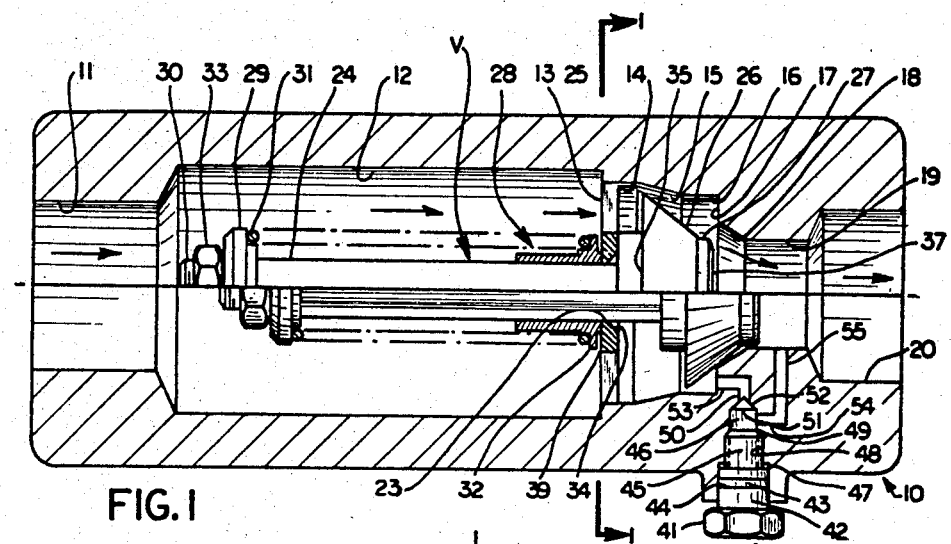
FIG. 1 is a longitudinal section through a fluid fuse embodying the features of this invention and showing the open and closed positions of the moving element.
Figures 2, 3, 4:
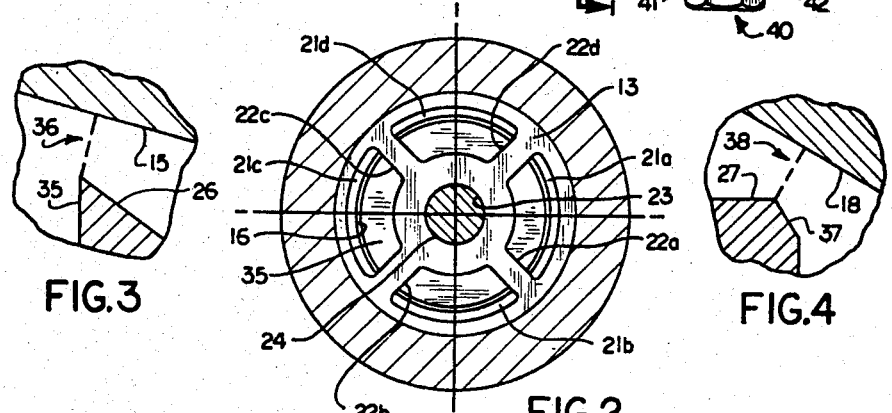
FIG. 2 is a sectional view taken in the plane 1—1 of FIG. 1.
FIG. 3 is an enlarged fragmentary longitudinal section in the plane of FIG. 1, illustrating the geometrically defined flow area of the fuse upstream orifice.
FIG. 4 is an enlarged fragmentary longitudinal section in the plane of FIG. 1, illustrating the geometrically defined flow area of the fuse downstream orifice.

A quick acting valve assembly or fluid fuse constructed in accordance with the present invention is illustrated in FIG. 1. The valve assembly includes a housing 10 which provides contiguously: inlet bore 11, transmission bore 12, slotted wall 13, spacing bore 14, conical bore 15, inter-orifice bore 16, wall 17, conical bore 18, outlet bore 19 and discharge bore 20. As shown in FIG. 2, slotted wall 13 has segmented openings 21a–21d that are formed between arms 22a–22d which support guide bearing 23.

A valve member V is provided in the housing 10. The valve member V has a valve stem or shaft 24 which mates with running clearance in guide bearing 23. The valve member V also includes cylindrical collar 25, shut-off cone 26 and lead cylinder 27 which are integrally formed with the shaft 24. Shaft 24 extends upstream through spring sleeve 28 and spring cap 29 and terminates at threaded cylinder 30. Spring 31 is held coaxially with shaft 24 by flange 32 of sleeve 28 and cap 29 and is retained by nut 33 which engages cylinder 30. Bearing bore 23 is made shorter than the thickness of wall 13 by conical relief 34. Shaft collar 25 is joined to wall 35 which forms the base of cone 26.

The circular intersection of wall 35 and cone 26 geometrically combines with conical bore 15, as illustrated in FIG. 3, to form a variable size orifice 36. The flow area of orifice 36 is the area of a conical surface that is perpendicular to the bore 15 and extends from bore 15 to the circular edge defined by the intersection of cone 26 and wall 13. The dashed line represents a line element of the area defining conical surface.

In the same manner and illustrated in FIG. 4, the area of orifice 38 is the area of a conical surface that is perpendicular to bore 18 and extends from bore 18 to the circular intersection of cylinder 27 and conical bevel 37. The dashed line represents a line element of the area defining conical surface. The orifice areas so defined are the minimum flow areas between the circular edges and the conical bores.

In the open state of the fuse illustrated in the upper half of FIG. 1 flow passes freely, as indicated by the arrows, from system components upstream of the housing 10, through bores 11 and 12, through openings 21a–21d in wall 13 and through spacing bore 14 to orifice 36. The flow resistance presented by orifice 36 causes the fluid pressure to be reduced as the flow passes into bore 16. The surfaces of cone 26 and bore 15 provide a passage of uniform expansion from orifice 36 into bore 16. Thus in the open state an essentially loss free passage from orifice 36 to orifice 38 is provided. The flow resistance presented by orifice 38 causes the fluid pressure to reduce as flow passes into bore 19. The bore 19 is connected in fluid communication with system components downstream of the housing 10.

The circular edge formed by the intersection of wall 35 and cone 26 and the circular edge formed by the intersection of cylinder 27 and cone 37 are made relatively sharp, and thereby the orifices 36 and 38 are viscosity insensitive. It then follows that the viscosity insensitivity of the trigger flow rate, that is the flow rate at which the valve V snaps to a closed position, is independent of the open state ratio of the area of orifice 38 to that of orifice 36. It can be shown mathematically that the pressure drop across orifice 36 acts on an area equal to that of the full base of cone 26 and the pressure drop across orfice 38 acts on an area equal to that of the end face of cylinder 27. The closing force is the sum of the forces produced by the pressure drops across orifices 36 and orifice 38. The bias force that must be provided by spring 31 is equal to the sum of the forces produced by the two orifice pressure drops at the trigger flow rate. As illustrated in FIG. 1, the area of the base of cone 26 is substantially larger than the area of the end face of cylinder 27 and, therefore; the pressure drop across orifice 36 provides the dominant contribution to the bias load. Furthermore, the large area of the base of cone 26 permits high bias loads with relatively low pressure drop.

The maximum load on spring 31 is the bias force plus the compression load. The compression load is the product of the stroke of shaft 24 from the open position to the closed and the rate of spring 31. The stroke can be shortened by moving wall 17 and conical bore 18 toward cone 26 but, this change would simultaneously decrease the area of orifice 38 and result in an increase in the bias force. For a given set of conditions this counteracting effect can result in either a decrease or an increase in maximum spring load. It can be shown mathematically that for a given spring rate and set of geometric conditions an open-position area of orifice 38 exists with which the contribution of orifice 38 to the maximum spring load is a minimum. The bias force that results from this orifice size produces the highest possible trigger flow rate and the maximum trigger shock resistance at maximum system flow rate that is obtainable with the set of geometric conditions.

It is characteristic of springs that high loads require high spring rates. This characteristic makes it extremely difficult to employ high bias loads in the nontriggering fuses of the prior art. The fuse of this invention triggers because of the rate of increase of fluid closing force, due to reduction of orifice areas with travel in the closing direction, produces a negative spring rate effect. The trigger action, that is the action by which the valve member V quickly snaps closed, through its negative spring rate effect, makes high spring bias loads physically realizable in fluid fuses. It is only necessary that the bias spring rate be less than the hydraulic, negative spring rate. Our application studies show that the negative spring rate is characteristically and substantially higher than present metallurgy permits in applicable wire springs. The high bias spring forces provides high resistance to axial shock in the closing direction and, the high spring rate prevents resonant osicillation in the frequency band occurring in normal practice.

Figures 5A, 5B, 5C:
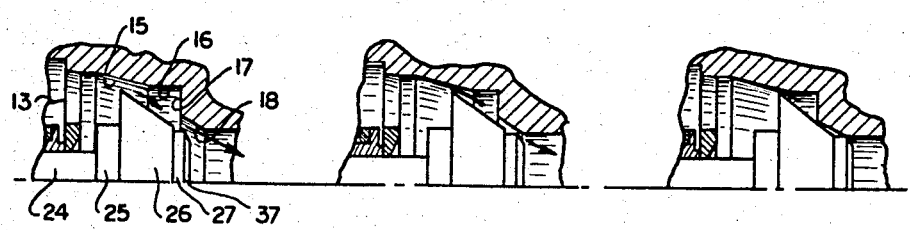
FIGS. 5a–5c are fragmentary longitudinal sections in the plane of FIG. 1 and showing three positions of the moving element between the full open and full closed positions shown in FIG. 1.

It can be seen from FIG. 1 that in the open state the spring force clamps the base of sleeve 28 and collar 25 to opposite sides of wall 13. This clamping action holds shaft 24 perpendicular to wall 13 and simultaneously bore 23 holds it concentric with the downstream bores. When the trigger flow rate is reached collar 25 moves away from wall 13. In this state the shaft is free to move angularly with respect to the axis of bore 23. The motion is permitted by the clearance with bore 23 and the shortness of it. The sleeve flange 37 is back relieved to a small diameter as shown at 39. This relief reduces the resistance of the sleeve to angular deflection of the shaft. During the closure transient the symmetry of the con and of the bores precludes the occurrence of side forces sufficient to overcome the angular resistance of sleeve 28. The side forces that can occur at seating easily overcome this resistance. The cone angle of cone 26 is greater than the cone angle of bore 18. For this reason cone 26 seats on the circular intersection of wall 17 and cone 18. If due to the running clearance between shaft 24 and bore 23 or to a small eccentricity of bore 23 with respect to the downstream bores, bevel 37 of cylinder 27 strikes the wall of conical bore 18, the shaft angular freedom will permit cylinder 27 to slide into bore 19. The illustration of FIGS. 1 and 5C show that just prior to seating and after, shaft 24 is held in axial alignment by its engagement with the two axially spaced bores 23 and 19. The shaft clearance with the bores and the short axial engagement permits lateral and angular movement of cone 26 through the pressure forces to urge cone 26 into full circular seating position.

The fuse triggers or snaps closed because the rate of increase of hydraulic closing force due to reduction of orifice areas with travel in the closing direction is greater than the increase of spring force with that travel. This trigger action produces acceleration only and could result in destructive impact at shut off. The manner in which the fuse of this invention provides a high rate of deceleration to prevent destructive impact at shut-off will be described with reference to FIGS. 5a–5c. In FIG. 5a the cone and cylinder, assembly is at approximately half stroke. At this point in the triggering action the acceleration has produced a high velocity. The flow components in the chamber defined between orifice 36 and orifice 38 are: the flow entering through orifice 36, the flow pumped in by cone 26 and the flow leaving through orifice 38. Because orifices 36 and 37 are still relatively large the flow out of orifice 38 is the sum of the flow in through orifice 36 and the flow pumped by cone 26. This flow distribution causes the pressure between the two orifices to rise. The rise in pressure reduces the in-flow from orifice 36 and increases the out-flow through orifice 38 and, the rise in pressure reduces the acceleration. In the position shown in FIG. 5b orifice 38 has reduced to nearly its clearance area while the area of orifice 36 is well above its clearance area. In this case the high resistance of orifice 38 causes the flow pumped by cone 26 to pass out of orifice 36. This flow reversal causes the pressure between the orifices to be greater than the pressure upstream of orifice 36 and deceleration occurs. In the position shown in FIG. 5c the fuse is very close to shut-off. The resistance of orifice 38 is much higher than that of orifice 36 because both its clearance and its diameter are substantially smaller. No significant flow passes out of orifice 38 and substantially all of the flow pumped by cone 26 passes backward through orifice 36. The pressure acting on cone 26 is much higher than the pressure upstream of orifice 36 and a very high deceleration occurs. At closure shown in the lower half of FIG. 1 the velocity of impact is a small fraction of the peak velocity reached in the closure transient. It should be obvious to those skilled in the art that the degree of snubbing action can be varied by variation of the length of travel in the zone of minimum area of orifices 36 and 38. It can further be observed from FIGS. 5a–5c that during the period of motion of shaft 24 it is radially restrained by bore 23 alone. Thus, small misalignment cannot cause shaft 24 to bind.

When the fluid fuse is in the open position, the sharp edge formed at the intersection of the cone 26 (FIG. 3) and wall 35 cooperates with the large diameter end portion of the converging surface or conical bore 15 to form a first variable size orifice 36. The intersection between the cylindrical surface 27 (FIG. 4) and the conical surface 37 forms a second sharp edge which cooperates with the large diameter end portion of the converging surface or conical bore 18 to form a second variable size orifice 38. When the valve is in the open position (shown in the upper portion of FIG. 1), the pressure drops across orifices 36 and 38 result in closing forces on the valve which are proportional to the pressure drops. The closing forces across the orifices 36 and 38 when the valve is in the open position enable the valve to have a relatively short operating stroke and a strong biasing spring 31.

With reference to FIG. 1 manual bypass control screw 40 has a hexagonal head 41, O ring cylinder 42 having groove 43 and O ring 44 therein. Integral screw 45 and coned pintle 46 extend coaxially from cylinder 45. Cylinder 42 and screw 45 mate with bores 47 and 48 respectively in housing 10. Pintle chamber 49 in housing 10 joins coaxial passage 50 through conical transition 51. Cone 52 of pintle 46 mates with the conical transition 51. passage 50 communicates with bore 16 through passage 53. Pintle chamber 49 communicates with bore 19 through passages 54 and 55. If a shut-off has occurred and the line has been replaced or repaired but, the trapped pressure holds cone 26 in the shut-off position, the fuse can be reset to the open state by backing cone 52 from its seat. Flow will then pass through the clearance between cone 26 and bore 16 and into the downstream line through passages 54 and 55. It should be noted that the clearance area between cone 26 and bore 16 is relatively large because of the large diameter and accordingly the flow is sufficient for the purpose. The bypass valve construction shown in FIG. 1 is merely representative. Many mechanical modifications of this bypass method are possible without departing from the intended scope of this invention.

With reference to FIGS. 6–8 shaft 24 is bored to contain an over pressure relief valve. Upstream bore 55 passes through threaded cylinder 30 and communicates with orifice 56. Valve guide bore 58 extends from the downstream end of shaft 24 to orifice 56. Valve piston 59 has flutes 60 and cone 61 and mates slidably with bore 58. Spring 62 is held coaxially by button 63 of piston 59 and, at its opposite end it is held coaxially by button 64 of retaining screw 65. Retaining screw 65 has flutes 66 and mates with threads in bore 58. When the pressure acting on the area of cone 61 exposed by orifice 57 produces a force greater than the bias force of spring 62 piston 59 moves in the downstream direction, drawing cone 61 out of its sealed position in orifice 57. The flow from orifice 57 passes through flutes 60 from which it passes on the outside of spring 62 in bore 58. The discharge is made through the flutes 66 of retaining screw 65. The flow through the flutes 60 causes a further compression of spring 62 which may drive the spring to its solid height. In this construction flow paths through the coils of the spring are not utilized and for this reason the spring can close completely without consequence.

Although a fluid fuse constructed in accordance with the present invention can be used in many different systems and actuated under many different operating conditions, the fluid fuse will be actuated when there is (1) a gradual increase in fluid flow through the fuse to the trigger flow rate, or (2) a sudden increase in fluid flow upon failure of a conduit or other component of a system with which the fuse is associated. Under either condition, the valve member is quickly moved from the open position, shown in the upper portion of FIG. 1, to the closed position, shown in the lower portion of FIG. 1.

When the valve member is in the open position with fluid flowing through the fuse, the valve member is urged from the open position toward the closed position against the biasing force of the spring 31 with a fluid pressure force of a magnitude which is a function of magnitude of the pressure drops across the two orifices 36 and 38. Thus, when the valve member is in the open position, there is a pressure drop across the orifice 36. This pressure drop results in the application of fluid force to the valve member urging the valve member toward the closed position. In addition, there is a pressure drop across the orifice 38. The effect of the pressure drop across the orifice 38 is to increase the fluid pressure force applied against the valve member when the valve member is in the open position.

Due to the pressure drops across the two orifices 36 and 38, the valve member is urged toward the closed position against the spring force during fluid flow with the valve member in the open position. This fluid force enables the valve member to quickly move from the open position toward the closed position when the trigger fluid flow rate is reached. If the fluid flow is gradually increased to the trigger flow rate, the fluid pressure force urging the valve member toward the closed position will gradually increase until it becomes just equal to the spring force urging the valve member toward the open position. A further incremental increase in the fluid flow will result in triggering or snap action of the valve member from the open position to the closed position under the influence of the fluid pressure force applied to the valve member.

Figure 9:
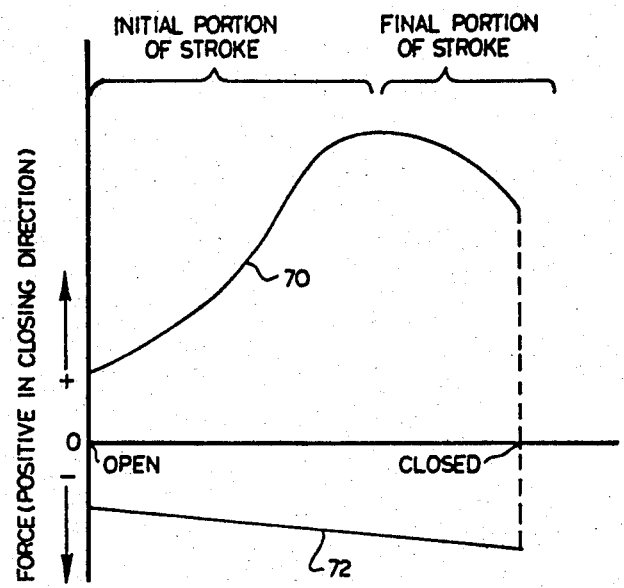
FIG. 9 is a graph illustrating the relationship between the position of the valve in the fluid fuse during an operating stroke which occurs as a result of a gradual increase in fluid flow to trigger flow and the magnitudes of the spring and fluid pressure forces applied to the valve.

Due to the interaction between the sharp edge portion of the cone-shaped head 26 and the converging surface 15 and due to the interaction between the sharp edge portion of the cylinder 27 and a converging surface 18, the fluid pressure force applied against the valve member at the predetermined trigger flow rate quickly increases, in the nonlinear manner indicated by the curve 70 in FIG. 9 as the valve member moves away from the open position. This increasing fluid pressure force accelerates the valve member toward the closed position to quickly actuate the fuse assembly. The force applied against the valve member by the biasing spring 31 in the opening direction increases in a linear manner indicated by the curve 72 in FIG. 9.

During an initial portion of a stroke of the valve member from the open position to the closed position, the interaction between the sharp edges on the head of the valve member and the converging surfaces 15 and 18 causes the fluid pressure force against the valve member to increase at a rate which increases with movement of the valve member. This results in the fluid pressure force in the closing direction increasing faster than the spring force in the opening direction during an initial portion of the stroke of the valve member. Thus, for each increment of movement of the valve member away from the open position during the initial portion of the stroke of the valve member, the magnitude of the amount by which the fluid pressure force applied to the valve member exceeds the spring force applied to the valve member increases at a rate which increases as the valve member moves further from the open position. This occurs even though the fluid flow rate through the fluid fuse has been slowly increased to a fluid flow rate which only slightly exceeds the trigger flow rate.

After the valve member has moved approximately two thirds of the way toward the closed position, the valve member is decelerated to reduce deformation of the valve member as it engages the circular corner at the large diameter end of the converging surface 18. The deceleration of the valve member is due to the rise in pressure between the two orifices 36 and 38 in the manner previously explained in connection with FIGS. 5a, 5b and 5c.

The rise in fluid pressure force between the two orifices 36 and 38 causes the total or net fluid pressure force on the valve member to decrease during the final portion of the stroke, in the manner illustrated by the curve 70 in FIG. 9. Since the biasing spring continues to be compressed, the spring force against the valve member increases while the fluid pressure force is decreasing. This results in a rapid deceleration of the valve member during the final portion of the stroke.

During the large majority of an operating stroke of the valve member, the sharp circular edge at the intersection of the conical valve surface 26 and end surface 35 is disposed radially inwardly of the conical housing surface 15. Similarly, during the large majority of an operating stroke of the valve member, the sharp circular edge at the intersection of the conical bevel 37 and lead cylinder 27 is disposed radially inwardly of the conical housing surface 18. Therefore, during the large majority of the operating stroke of the valve member, the orifices 36 and 38 are decreasing in size as the sharp circular valve edges move from their open positions adjacent to the large diameter end portions of the conical housing surfaces 15 and 18 to their closed positions adjacent to the small diameter end portions of the conical housing surfaces.

The foregoing description of the actuation of the fluid fuse of FIG. 1 from the open condition to the closed condition relates to operation of the fluid fuse in response to a gradual increase in the flow rate through the fluid fuse to a flow rate which exceeds the trigger flow rate. However, it has been demonstrated that the fluid fuse will provide very important protection under circumstances in which there is a sudden increase in fluid flow upon failure of the fluid conduit or other structural component downstream of the fluid fuse.

Prior to failure of a structural component of the system, all of the structural components of the system, such as hoses, metal tubing and/or fittings, are elastically expanded by the pressure of the fluid contained in these components. More importantly, the fluid, whether it be a gas or liquid, in the structural components of the system is compressed.

There can be a sudden failure of a structural component in the system downstream of the fuse assembly under two different circumstances. Thus, the structural failure can occur when (1) there is no flow of fluid through the system immediately prior to the failure, or (2) there is a normal operating flow of fluid through the system immediately prior to the failure. Under either circumstance, when there is a failure of a structural component of the system downstream of the fuse assembly, the fluid pressure in the structural components of the system downstream of the fuse assembly is suddenly reduced. This results in a rapid increase in the pressure drop across the fluid fuse. The increased pressure drop across the fluid fuse results in a sudden increase in the flow of fluid through the fluid fuse. The increased flow of fluid results from the expansion of the fluid contained in the structural components of the system upstream of the fluid fuse and an elastic contraction of the structural components of the system upstream of the fluid fuse. The combination of the expansion of the fluid and elastic contraction of the structural components of the system results in what is referred to herein as decompression fluid flow. Thus, prior to the sudden failure of a component of the system downstream from the fuse, all of the structural components of the system, such as hoses, metal tubing and/or fittings, are elastically expanded by the pressure of the fluid contained in the components. More importantly, the liquid in all of the structural components of the system is compressed by the fluid pressure. When there is a failure of a structural component of the system downstream of the fuse assembly, the fluid in the system suddenly expands and the components of the system suddenly contract with a resulting decompression fluid flow and a very high flow rate. Of course, the relatively high flow rates which occur during decompression fluid flow cannot be maintained much longer than the very short time period required for decompression of the fluid in the system and elastic contraction of the components of the system.

When the fluid in the system is static, that is, there is no flow through the fluid fuse, a sudden failure of a component of the system results in the fluid fuse being actuated solely by decompression fluid flow. The decompression fluid flow actuates the valve assembly or fluid fuse (FIG. 1) to a closed condition in the short time period before the decompression fluid flow has been depleted. Thus, the valve member is quickly moved through a continuous operating stroke from the open position shown in the upper part of the drawing in FIG. 1 to the closed position shown in the lower part of the drawing in FIG. 1 by the decompression fluid flow. If the fuse assembly is not closed before depletion of the decompression fluid flow, the fluid pressure applied to the valve member upon completion of the decompression fluid flow will not be sufficient to overcome the spring force and the fluid fuse will not close.

Figure 10:
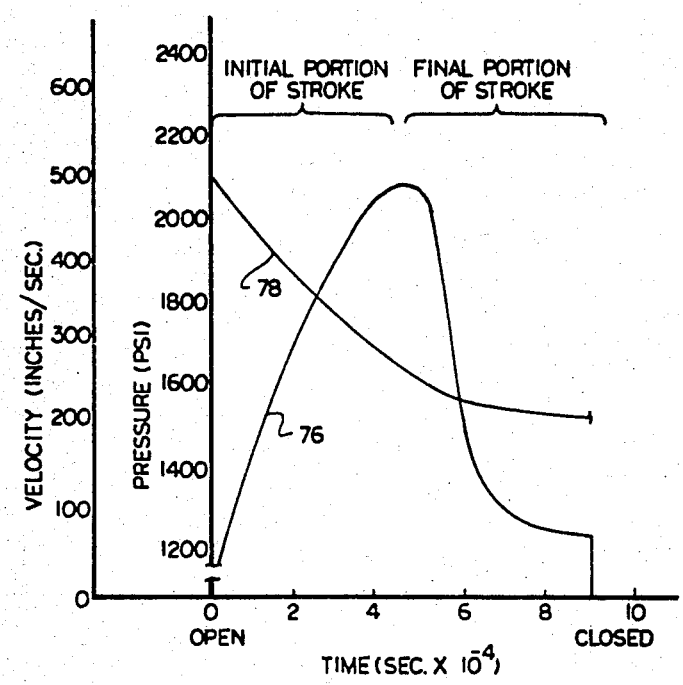
FIG. 10 is a graph illustrating the magnitude of the fluid pressure immediately upstream of a valve member in the fluid fuse and the velocity of movement of the valve member as a function of the length of time required for the valve member to move from an open position to a closed position upon decompression fluid flow in a previously static system.
Figure 11:
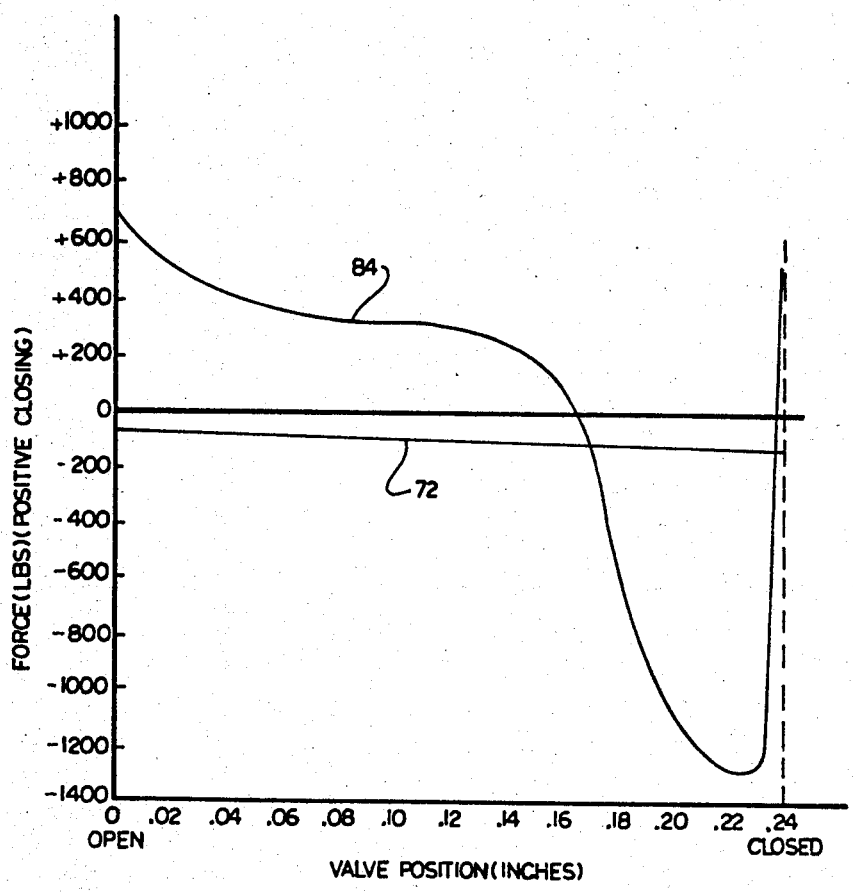
FIG. 11 is a graph illustrating the relationship between the position of the valve in the fluid fuse during an operating stroke and the magnitudes of the spring and closing force applied to the valve upon decompression fluid flow in a previously static system.

When the fluid in a system is static and a structural component downstream of the fluid fuse fails, for example, when a conduit ruptures, the decompression of fluid upstream of the fluid fuse and the elastic contraction of structural components of the system upstream of the fluid fuse cause a sudden surge of decompression fluid flow. This sudden surge of decompression fluid flow applies a fluid force against the cone or head end 26 of the valve member to quickly urge the valve member from the open position to the closed position. The response of the pressure of compressed oil and of fused parameters, to a rupture downstream of a static system, obtained from tests of an experimental model constructed in accordance with this invention, is shown in FIGS. 10 and 11. Thus, the decompression fluid flow causes the fluid pressure upstream of the valve member, that is in the transmission bore 12 and inlet bore 11 (FIG. 1) to decrease in the manner indicated by the curve 78 in FIG. 10. This decrease in pressure results from the decompression flow of fluid through the fuse assembly.

Due to the previously described interaction between the two sharp edged orifices 36 and 38 formed between the valve member and the converging surfaces 15 and 18, the fluid pressure force applied against the valve member upon initiation of the decompression fluid flow quickly accelerates the valve member toward the closed position. The velocity of the valve member increases during the initial portion of a stroke of the valve member in the manner indicated by the curve 76 in FIG. 10. This rapid acceleration of the valve member from the open position toward the closed position occurs even though the fluid pressure upstream of the valve member is decreasing in the manner indicated by the curve 78 in FIG. 10.

Due to fluid flow forces and the fluid pressure upstream of the valve member, the total or net closing force applied against the valve member during the initial portion of the stroke decreases in the manner indicated by the curve 84 in FIG. 11 during decompression fluid flow. Although the fluid pressure upstream of the fluid fuse is decreasing in the manner indicated by the curve 78 in FIG. 10, the total closing force applied to the valve member decreases at a much slower (see curve 84 in FIG. 11) rate during the initial portion of the operating stroke of the valve member due to the flow forces resulting from the change in momentum of the fluid as it is accelerated during flow through the orifices 36 and 38 and other fluid flow effects. Therefore, the valve member is quickly accelerated to the relatively high velocity indicated by the curve 76 in FIG. 10 during the initial decompression fluid flow and movement of the valve member toward the closed position.

After the valve member has moved slightly less than half way toward the closed position during decompression fluid flow, the valve member is decelerated. This is done to reduce deformation of the valve member as it engages the circular corner at the large diameter end of the converging surface 18. Deceleration of the valve member is due to a rise in pressure between the two orifices 36 and 38.

During movement of the valve member through the final portion of its stroke under the influence of decompression fluid flow, the flow pumped by cone 26 causes a high pressure of the fluid trapped between the two orifices 36 and 38 causes a reversal of the total or net fluid pressure force applied against the valve member. Thus, as indicated by the curve 84 in FIG. 11, the fluid pressure force against the valve member in the final portion of the operating stroke, changes from a positive force urging the valve member toward the closed position to negative force urging the valve member back toward the open position. The relatively large negative or reverse fluid pressure force applied to the valve member occurs with the reverse flow of fluid illustrated in FIG. 5b of the drawings. This reverse fluid pressure force is added to the spring force to decelerate the valve member from a very high velocity at the end of the initial portion of its stroke (see the curve 76 in FIG. 10) to a relatively low velocity immediately before closure.

The reversal of the fluid pressure force applied to the valve member during the final portion of the stroke of the valve member (see the curve 84 in FIG. 11) results in deceleration of the valve member at a maximum rate which is greater than the maximum rate of acceleration of the valve member during an initial portion of an operating stroke. Thus, for the fluid fuse whose operating characteristics with decompression fluid flow are indicated in FIGS. 10 and 11, the valve member is accelerated from the open position to a velocity of approximately 475 inches per second in about 0.00035 seconds. However, the valve member is decelerated from a speed of 475 inches per second to a speed of approximately 140 inches per second in approximately 0.00010 seconds. The deceleration of the valve member then continues at a more gradual rate and the fluid pressure force against the valve member becomes positive in the final closing movements of the valve member due to the pressure drop across the seating restriction (see the curve 84 in FIG. 11).

A valve member having the operating characteristics shown in FIGS. 10 and 11 moves from the open position to the closed position, under the influence of only decompression fluid flow in a previously static system, in approximately 0.00092 seconds. The closing of the valve member occurs before depletion of the decompression fluid flow so that a fluid pressure of approximately 1575 p.s.i. is locked into the system upstream of the fluid fuse (see the curve 78 of FIG. 10). If the fluid fuse were to respond more slowly, say in approximately 0.005 seconds, all of the decompression fluid flow would have been depleted and closure of the fluid fuse would not have occurred. The rapid operation of the fluid fuse of the present invention enables the valve member to close during the decompression fluid flow to thereby minimize the amount of liquid which is lost from the system and to maximize the protection which is provided to the system.

Since the fluid fuse of the present invention can be operated under the influence of only decompression fluid flow, the fluid fuse can be used to protect either a system in which the fluid is flowing under pressure or a system in which fluid is static and under pressure before there is a sudden failure of a structural component of the system. In either type of system, the failure of a structural component downstream of the fluid fuse will result in an excessive fluid pressure drop across the fluid fuse and decompression fluid flow as the fluid pressure upstream of the fluid fuse is decreased. In a flowing system, the normal operating flow through the fuse immediately prior to failure of a structural component downstream of the fluid fuse is added to the decompression fluid flow. Under this condition, the decompression fluid flow provides the additional flow required to cause the fluid fuse to be actuated.

In view of the foregoing description, it is apparent that the fluid fuse of the present invention can protect a system under many different operating conditions. Thus, the fluid fuse snaps or triggers to a fully closed position in response to a fluid flow which gradually increases to exceed a predetermined trigger flow. The fluid fuse of the present invention also closes in response to a sudden increase in fluid flow upon a failure of a conduit or other component of the system when the fluid in the fuse is either static or flowing at a normal operating rate. Upon a sudden failure of a structural component of the system downstream from the fluid fuse, the fluid fuse snaps or triggers to the closed position during the resulting decompression fluid flow.

Rapid movement of the valve member from the open position to the closed position is obtained by the combined effect of the two orifices 36 and 38 on the fluid pressure flow through the fuse. Thus, when the fuse is in the open position and fluid is flowing through the fuse, there is a fluid pressure drop across the orifice 36 and orifice 38. The combined effect of these fluid pressure drops is to establish a fluid pressure force which urges the valve member toward the closed position.

During normal operating conditions, the fluid pressure force applied to the valve member by fluid flow through the fuse is less than the spring force so that the valve member remains in the open position. However, upon either a gradual increase in the fluid flow to a flow rate which is greater than the trigger flow rate or upon the sudden establishment of a decompression fluid flow, the fluid pressure forces against the valve member are increased to exceed the spring biasing force. This results in movement of the valve member toward the closed position. As the valve member moves toward the closed position, the sharp edge portions of the valve member cooperate with the converging surfaces 15 and 18 to increase the fluid pressure drop across the orifices 36 and 38 to effect rapid movement of the valve member to the closed position.

Although preferred embodiments of this invention have been shown and described in detail, it is recognized that the invention is not limited to the precise form and structure shown in various modifications and rearrangements as will occur to those skilled in the art upon full comprehension of this invention may be resorted to without departing from the scope of the invention as defined in the claims.

Having described one specific preferred embodiment of the invention, the following is claimed:

1. A method of operating a valve assembly in a system having other structural components which hold static hydraulic fluid under pressure and which are elastically expandable by fluid pressure, said method comprising the steps of elastically expanding structural components of the system upstream of the valve assembly under the influence of fluid pressure applied against the strucutral components of the system by static hydraulic fluid in the structural components, compressing the static hydraulic fluid in the structural components of the system upstream of the valve assembly, and, thereafter, operating the valve assembly under the influence of only decompression fluid flow resulting from decompression of static hydraulic fluid and elastic contraction of structural components of the system containing static hydraulic fluid to block fluid flow through the valve assembly upon a rapid decrease in fluid pressure in the system due to failure of a structural component of the system downstream of the valve assembly, said step of operating the valve assembly being performed during the decompression fluid flow and including moving a valve member from an open position providing a relatively low resistance to a flow of hydraulic fluid through the valve assembly to a closed position blocking fluid through the valve assembly under the influence of fluid pressure forces applied to the valve member and against the force of a biasing spring during the decompression fluid flow.

2. A method as set forth in claim 1 wherein said step of moving the valve member from the open position to the closed position during decompression fluid flow includes moving the valve member from the open position to the closed position substantially independently of the viscosity of the static hydraulic fluid in the system prior to failure of a strucutral component of the system downstream of the valve assembly so that the valve member moves from the open position to the closed position during decompression fluid flow of hydraulic fluids of different viscosities.

3. A method as set forth in claim 1 further including the step of increasing the velocity of the valve member as the valve member moves away from the open position to quickly move said valve member toward the closed position during an initial portion of the decompression fluid flow upon a failure of a strucutral component of the system downstream of the valve assembly and elastic contraction of structural components of the system upstream of the valve assembly.

4. A method as set forth in claim 3 further including the step of decreasing the velocity of the valve member shortly before the valve member reaches the closed position and while there is decompression fluid flow.

5. A method as set forth in claim 1 wherein the valve member is movable through an operating stroke from the open position to the closed position during decompression fluid flow upon failure of a strucutral component of the system downstream of the valve assembly, said method further including the steps of moving the valve member through an initial portion of an operating stroke under the influence of fluid pressure force directed toward the closed position of said valve member and resulting from decompression fluid flow and reversing the direction of the fluid pressure force applied to the valve member during at least a part of a final portion of the operating stroke while there is still decompression fluid flow to thereby reduce the velocity of the valve member before the valve member reaches the closed position.

6. A method as set forth in claim 1 wherein said step of moving the valve member from the open position to the closed position takes plane in approximately 0.00092 seconds.

7. A method of operating a valve assembly in a system having other structural components which are elastically expandable by fluid pressure, said method comprising the steps of conducting an initial flow of hydraulic fluid under pressure through the valve assembly and other structural components of the system, elastically expanding structural components of the system upstream of the valve assembly under the influence of hydraulic fluid pressure during the initial flow of hydraulic fluid through the system, compressing the hydraulic fluid in the sturctural components of the system during the initial flow of hydraulic fluid, and, thereafter, operating the valve assembly under the combined influence of the initial flow of hydrualic fluid and a decompression fluid flow resulting from decompression of hydraulic fluid and elastic contraction of structural components of the system to block fluid flow through the valve assembly upon a rapid decrease in fluid pressure in the system due to failure of a structural component of the system downstream of the valve assembly, said step of operating the valve assembly being performed during the decompression fluid flow and including moving a valve member from an open position providing a relatively low resistance to a flow of hydraulic fluid through the valve assembly to a closed position blocking fluid flow through the valve assembly under the influence of fluid pressure force applied to the valve member by the combined initial and decompression fluid flows and against the force of a biasing spring during the decompression flow.

8. A method as set forth in claim 7 wherein the valve member moves from the open position to the closed position substantially independently of the viscosity of the hydraulic fluid in the system so that the valve member moves from the open position to the closed position during decompression fluid flow of hydraulic fluids of difference viscosities.

9. A method as set forth in claim 7 further including the step of increasing the velocity of the valve member as the valve member moves away from the open position to quickly move the valve member toward the closed position during an initial portion of the decompression fluid flow upon a failure of a structural component of the system downstream of the housing and during elastic contraction of structural components of the system upstream of said valve means.

10. A method as set forth in claim 9 further including the step of decreasing the velocity of the valve member shortly before the valve member reaches the closed position while there is decompression fluid flow.

11. A method as set forth in claim 7 wherein the valve member is movable through an operating stroke from the open position to the closed position during decompression fluid flow, said method further including moving the valve member through an initial portion of an operating stroke under the influence of fluid pressure force directed toward the closed position of the valve member, said method further including reversing the direction of the fluid pressure force applied to the valve member during at least a part of a final portion of the operating stroke while there is still decompression fluid flow to thereby reduce the velocity of the valve member before the valve member reaches the closed position.

12. A method as set forth in claim 11 wherein said step of moving the valve member from the open position to the closed position takes place in approximately 0.00092 seconds.

* * * * *